United States Patent [19]
Grosfeld et al.

[11] Patent Number: 5,581,067
[45] Date of Patent: Dec. 3, 1996

[54] COMPACT BAR CODE SCANNING MODULE WITH SHOCK PROTECTION

[75] Inventors: Henry Grosfeld, Great Neck; Robert Doran, East Setauket; Paul Dvorkis, Stony Brook; Hal Charych, East Setauket, all of N.Y.

[73] Assignee: Symbol Technologies, Inc., Holtsville, N.Y.

[21] Appl. No.: 326,328

[22] Filed: Oct. 20, 1994

Related U.S. Application Data

[63] Continuation-in-part of Ser. No. 153,053, Nov. 17, 1993, Pat. No. 5,504,316, which is a continuation-in-part of Ser. No. 868,401, Apr. 14, 1992, Pat. No. 5,280,165, which is a division of Ser. No. 520,464, May 8, 1990, Pat. No. 5,168,149.

[51] Int. Cl.$^6$ ..................................................... G06K 7/10
[52] U.S. Cl. ............................................ 235/462; 235/472
[58] Field of Search .................................. 235/462, 472; 359/198, 199

[56] References Cited

U.S. PATENT DOCUMENTS

| | | | |
|---|---|---|---|
| 4,845,350 | 7/1989 | Shepard | 235/472 |
| 5,198,651 | 3/1993 | Barkan | 235/472 |
| 5,206,492 | 4/1993 | Shepard | 235/472 |
| 5,247,384 | 9/1993 | Inoue | 359/199 |
| 5,262,627 | 11/1993 | Shepard | 235/472 |
| 5,298,729 | 3/1994 | Wike, Jr. | 235/467 |

OTHER PUBLICATIONS

"A Precision Two-Coordinate One-Mirror Scanning Device" by V. L. Mamaev & B. S. Rosov translated from Pribory i Tekhnika Eksperimenta, No. 1, pp. 227–229 Jan.–Feb. 1976.

Primary Examiner—Donald T. Hajec
Assistant Examiner—Karl Frech
Attorney, Agent, or Firm—Kirschstein, et al.

[57] ABSTRACT

A scanner module for use in a bar code reader has a scanning mirror which is mounted to a bracket by way of leaf-spring, allowing the mirror to oscillate in one direction. The bracket is hung from a stationary chassis by means of two strips of mylar film, allowing the entire bracket to oscillate in the perpendicular direction, thereby providing two dimensional oscillation of the mirror and raster scanning of a light beam reflected from the mirror. The mylar sheets are protected against mechanical shock by pins which pass through holes in the bracket. The pins are slightly smaller than the holes, allowing sufficient clearance for movement of the bracket during normal operation, but preventing too much stress being placed upon the mylar films if the module is dropped. The pins also provide accurate alignment of the bracket with respect to the chassis.

42 Claims, 3 Drawing Sheets

COMPACT BAR CODE SCANNING MODULE WITH SHOCK PROTECTION

REFERENCE TO RELATED APPLICATIONS

This application is a continuation-in-part of U.S. patent application Ser. No. 08/153,053, filed Nov. 17, 1993, now U.S. Pat. No. 5,504,316 which is a continuation-in-part of U.S. patent application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149.

This application is also related to U.S. patent application Ser. No. 08/294,438, filed Aug. 23, 1994, which is a continuation of Ser. No. 08/037,143, filed Mar. 29, 1993 now abandoned, which is a division of Ser. No. 07/715,267, filed Jun. 14, 1991, now U.S. Pat. No. 5,235,167.

This application is also related to Ser. No. 08/271,729, filed Jul. 7, 1994, which is a continuation of Ser. No. 07/981,448, filed Nov. 25, 1992, now abandoned.

This application is also related to Ser. No. 08/028,107, filed Mar. 8, 1993.

BACKGROUND OF THE INVENTION

1. Field of the Invention

The invention generally relates to a scanner module for use in an optical scanner, for example, a bar code scanner.

2. Description of the Related Art

A typical optical scanner (for example a bar code scanner) has a light source, preferably a laser light source, and means for directing the laser beam onto a symbol (for example a bar code) to be read. On route to the symbol, the laser beam is generally directed onto, and reflected off, a light reflecting mirror of a scanning component. The scanning component causes oscillation of the mirror, so causing the laser beam repetitively to scan the symbol. Light reflected from the symbol is collected by the scanner and detected by a detector such as a photodiode. Decode circuitry and/or a microprocessor algorithm is provided to enable the reflected light to be decoded, thereby recovering the data which is recorded by the bar code symbol.

Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of which patents have been assigned to the same assignee as the present invention, and all of which are hereby incorporated by reference.

In recent years, it has become more common for bar code scanners to have within them a distinct scanner module containing all the necessary mechanical and optical elements needed to create the scanning of the laser beam and to deal with the incoming reflected beam from the bar code that is being scanned. Using a separate scanner module, within the housing of the bar code scanner, facilitates a modular approach to design and manufacture, thereby keeping costs down, improving reliability, and facilitating the transfer of scanning technology to a variety of scanner housings. A typical prior art scanner module is disclosed in U.S. Pat. No. 4,930,848, to Knowles.

There are a large number of known ways of mounting a mirror within the scanning component to cause the necessary scanning motion of the laser beam. Some provide for oscillation in only a single direction, so that the scanning laser beam traces out a single path across the bar code being scanned. Others provide two dimensional scanning patterns, such as for example raster patterns or patterns of greater complexity. Examples of scanning components allowing two dimensional scanning are shown in U.S. Pat. No. 5,280,165, and in European Patent Application 540,781. Both of these are assigned to the same assignee as the present invention, and are hereby incorporated by reference.

As optical scanning systems have become more complex, and as the demand for smaller size and lower power consumption has increased, shock protection for the scanner modules has become more difficult. These highly efficient scan engines, with both resonant and nonresonant scanning elements are difficult to protect because the scanning element must be free to move for scanning but must be protected in the event of a shock (for example if the user drops the bar code scanner within which the scanner module is incorporated). Also, as sizes are reduced manufacturing tolerances begin to have more significant impacts on costs. Furthermore, it becomes more difficult to achieve accurate optical alignment during assembly and to maintain that optical alignment during the life of the product.

SUMMARY OF THE INVENTION

Objects of the Invention

It is a general object of the invention at least to alleviate the problems of the prior art.

It is an additional object to provide a scanner module in which the scanning element is protected against shock.

It is a further object to provide a scanner module of increased compactness.

It is a further object to provide a robust, compact scanner module having reduced manufacturing/assembly costs.

FEATURES OF THE INVENTION

According to an aspect of the present invention there is provided a scan module for use in a scanner for reading indicia having parts of differing light reflectivity, the scan module comprising:

a) a frame;

b) a scanning component mounted to the frame for oscillatory motion, the scanning component including an optical element for directing light in a scanning pattern across an indicia to be read, the scanning component having an aperture therein;

c) an anti-shock member, passing through the aperture in the scanning component, the anti-shock member being smaller in cross section than the size of the aperture, thereby providing clearance for the scanning component to oscillate in use, but preventing excessive movement of the scanning component with respect to the frame in the event that the module is subjected to a mechanical shock.

According to a further aspect of the invention there is providing a method of assembling a scan module for use in a scanner for reading indicia having parts of differing reflectivity, the scan module comprising: a frame; a scanning component to be mounted to the frame for oscillatory motion, the scanning component including an optical element for directing light in a scanning pattern across an indicia to be read, the scanning component having an aperture therein; and an anti-shock pin having a first head portion, a second head portion, and a waist portion having a smaller cross section than the first and second head portions; the method comprising: the following steps:

a) positioning the scanning component adjacent to the frame;

b) partially inserting the pin into the frame so that the second head portion passes through the aperture and extends from the aperture into a correspondingly-shaped bore in the frame, thereby aligning the scanning component with respect to the frame;

c) securing the scanning component to the frame; and d) continuing insertion of the pin into the frame so that the waist portion of the pin becomes located within the aperture, thereby providing clearance for the scanning component to oscillate in use, but preventing excessive movement of the scanning component with respect to the frame in the event that the module is subjected to a mechanical shock.

According to a further aspect of the invention there is provided a scan module for use in a scanner for reading indicia having parts of differing light reflectivity, the scan module comprising:

a) a frame;

b) a scanning component comprising a bracket mounted to the frame by flexible support means for oscillatory motion, the bracket carrying an optical element for directing light in a scanning pattern across an indicia to be read;

c) an electromagnetic coil mounted to the frame;

d) magnet means secured to the bracket adjacent the coil; and e) the bracket further including a counterweight portion balancing the mass of the optical element at the flexible support means, the counterweight portion at least partially overlying the coil.

According to yet a further aspect of the invention there is provided a scan module for use in a scanner for reading indicia having parts of differing light reflectivity, the scan module comprising:

a) a frame;

b) a scanning component comprising a main bracket mounted to the frame by flexible support means for oscillatory motion, the main bracket carrying an optical element for directing light in a scanning pattern across an indicia to be read, the main bracket having an aperture therein;

c) an electromagnetic coil mounted to the frame;

d) magnet means, secured to the bracket adjacent to the coil;

e) the bracket further including a counterweight portion balancing the mass of the optical element at the flexible support means, the counterweight portion at least partially overlying the coil; and f) an anti-shock member passing through the aperture in the main bracket, the member being smaller in cross section than the size of the aperture, thereby providing clearance for the scanning component to oscillate in use, but preventing excessive movement of the scanning component with respect to the claim in the event that the module is subjected to a mechanical shock.

Preferably, the scanning component comprises a main bracket (for example of a beryllium copper alloy) which includes a pair of hanging brackets by which the main bracket is secured to the frame. Each hanging bracket has attached to it a thin strip of a polyester film, the strip being secured at one end to the hanging bracket and at the other end to the frame. The main bracket therefore hangs from the frame on the strips. The strips can flex, allowing the main bracket to oscillate.

The main bracket desirably carries an optical element, such as a mirror, for directing light onto onto it in a scanning pattern across the indicia to be read. The mirror may be secured to the main bracket by a further flexure, allowing the mirror to oscillate independently of the main bracket. If the flexure supporting the mirror and the strips are arranged to flex in mutually perpendicular directions, two dimensional scanning patterns (such as raster patterns) can be produced.

The strips may be protected from mechanical shock by first and second anti-shock pins which pass through apertures in the hanging brackets. The diameter of the central portions of the pins is slightly smaller than the diameter of the apertures, thereby allowing the main bracket to oscillate in use. However, if a shock is applied to the scan module, the pins prevent excessive movement of the main bracket, and hence prevent over-stressing of the strips.

Each anti-shock pin may include an enlarged head portion, which is of substantially the same size and shape in cross section as the aperture in the respective hanging bracket. This allows the main bracket to be accurately positioned with respect to the frame during assembly of the scan module, when the pin is in a partially-inserted position. Once the position has been accurately determined, the main bracket may be secured to the frame, and the pins fully inserted.

The invention may be carried into practice in a number of ways, and one specific embodiment will now be described, by way of example, with reference to the accompanying drawings. The novel features which are considered as characteristic of the invention are set forth in particular in the appended claims. The preferred features of the invention, however, both as to its construction and its method of operation, together with additional objects and advantages thereof, will best be understood from the following description, when read in conjunction with the drawings.

DETAILED DESCRIPTION OF THE PREFERRED EMBODIMENT

Figure 4:
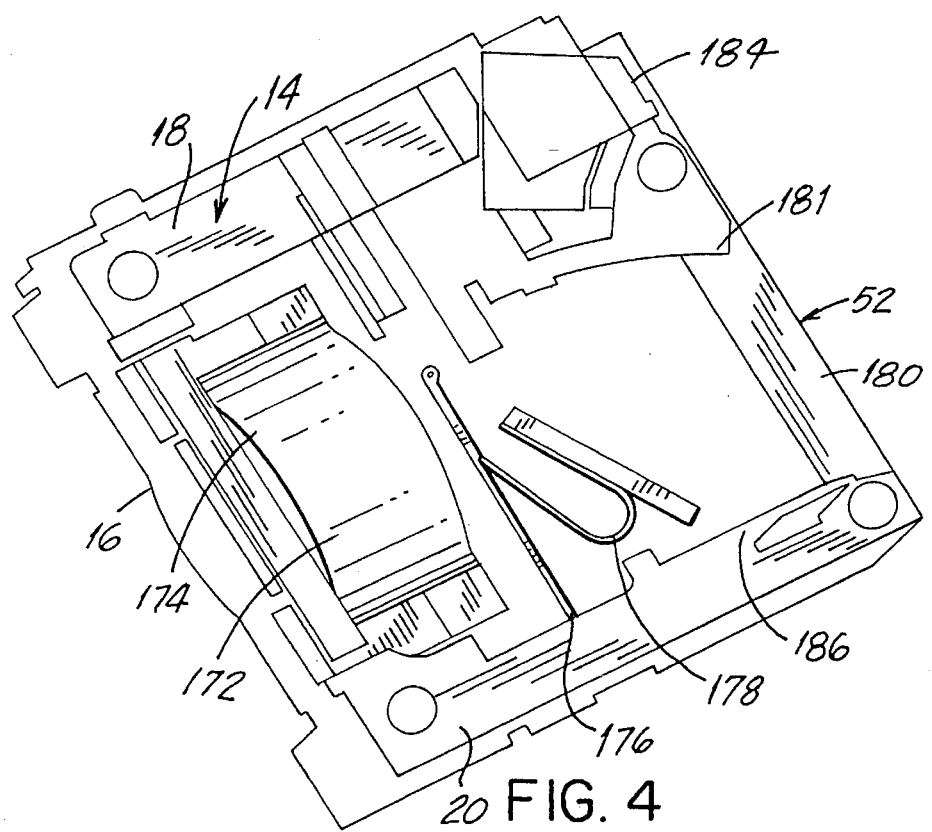
FIG. 4 is a view from below of the scanner module of FIG. 1.
Figure 5:
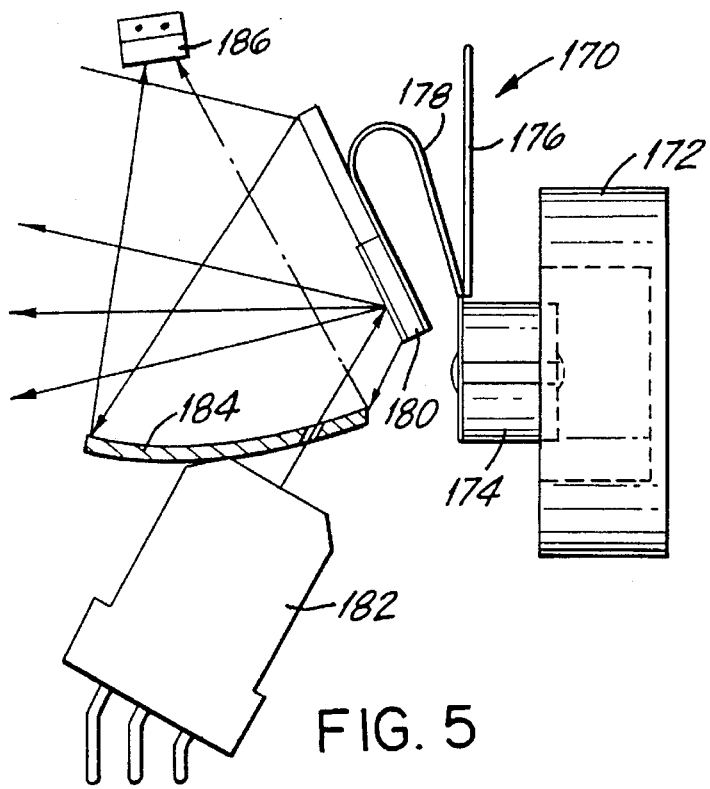
FIG. 5 shows, schematically, details of the scanning mechanism.
Figure 6:
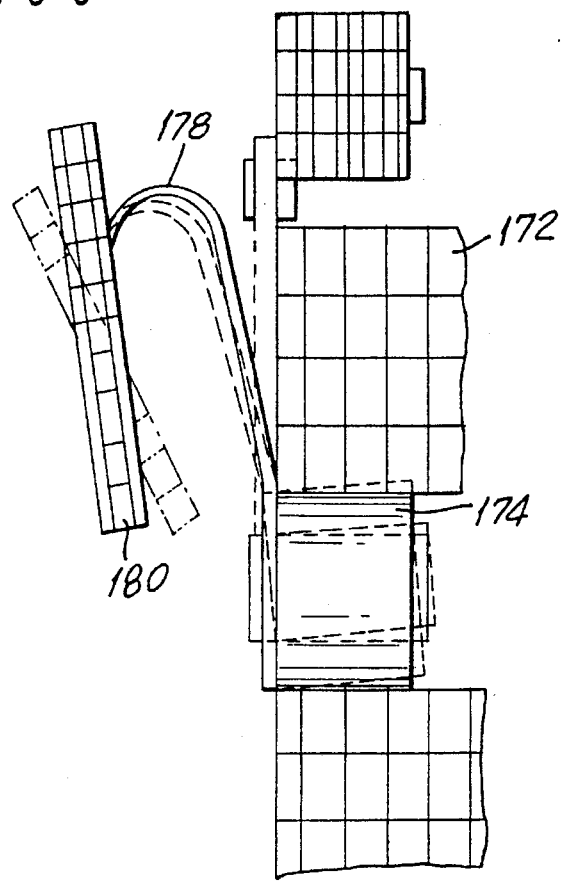
FIG. 6 shows the range of oscillation of the scanning element.

Reference will be made, first of all, to FIGS. 5 and 6 which show, schematically, details of the scanning arrangement. Following a description of these figures, reference will then be made to FIGS. 1 to 4 which show how the preferred scanning arrangement of FIGS. 5 and 6 may be incorporated into a scanning module.

The scanning arrangement 170 shown in FIG. 5 comprises an electromagnetic coil 172 having a central opening into which partially extends a permanent magnet 174. The coil 172 is rigidly secured to a support member (not shown), and the magnet 174 is resiliently coupled to the same support by means of an arm 176.

A U-shaped spring 178 is attached to the magnet 174 at one end, and the opposite end of the spring supports an optical element, preferably a reflector 180. Electrical leads (not shown) carry an energizing current or drive signal to the coil 172. The reflector 180 will oscillate in response to such electromagnet coil signal so as to scan in one or two dimensions, selectively. The spring 178 may be made of any suitable flexible materials, such as a leaf spring, a flexible metal coil or a flat bar having sufficient flexibility properties, and may be of a material such as a beryllium-copper alloy.

The reflector 180 is positioned between a laser beam source and lens assembly 182 and a target (not shown in FIG. 5). Between the reflector 180 and source 182 is a collector 184 having an 181 opening through which a light beam emitted by the laser source 182 may pass to the reflector 180. The collector is oriented so as to direct incoming light, reflected by reflector 180 and then collector 184, to a photodetector 186.

An important aspect of the embodiment of FIG. 5 is that the mass of reflector 180 is considerably less than the mass of permanent magnet 174. The mass of the mirror is selected to be less than about one-fifth the mass of the magnet, and the angle of vibration of the mirror as shown in FIG. 6, a diagram derived by computer simulation, is about seven times that of the permanent magnet.

The reflector 180 is capable of 2-D scanning. As described in copending application Ser. No. 07/943,232, filed on Sep. 10, 1992, the U-shaped spring 178 is formed of a plastic material, such as Mylar or Kapton. The arms of the U-shaped spring 178 and the planar spring 176 may be arranged to vibrate in planes which are orthogonal to each other. Mylar is a registered trademark of E. I. du Pont de Nemours and Co., Inc. for polyester material. Oscillatory forces applied to permanent magnet 174 by the electromagnetic coil 172 can initiate desired vibrations in both of the springs 178 and 176 by carefully selecting drive signals applied to various terminals of the coil, as discussed in the copending application. Because of the different frequency vibration characteristics of the two springs 178 and 176, each spring will oscillate only at its natural vibration frequency. Hence, when the electromagnetic coil 172 is driven by a signal having high and low frequency components, the U-shaped spring 178 will vibrate at a frequency in the high range of frequencies, and the planar spring 176 will vibrate at a frequency in the low range of frequencies.

A feature of the embodiment of FIG. 5 is that the laser beam emitted by source 182 impinges the reflector 180 at an angle that is orthogonal to the axis of rotation of the reflector. Hence, the system avoids droop in the 2-D scan pattern that tends to arise when the angle of incidence of the laser beam is non-orthogonal to the reflective surface.

Another feature of FIG. 5 is in the folded or "retro" configuration shown, with the laser beam source 182 off axis from that of the beam directed from the reflector 180 to the target. The detector field of view follows the laser path to the target by way of collector 184. The folded configuration shown is made possible by opening 181 in the collector. The retro configuration enables the scanning mechanism to be considerably more compact than heretofore possible.

Reference should now be made to FIGS. 1 to 4, which illustrate the preferred scanner module within which the scanning arrangement of FIGS. 5 and 6 may be incorporated. For ease of reference, parts of the module already described with reference to FIGS. 5 and 6 will be given the same reference numerals.

Figure 1:
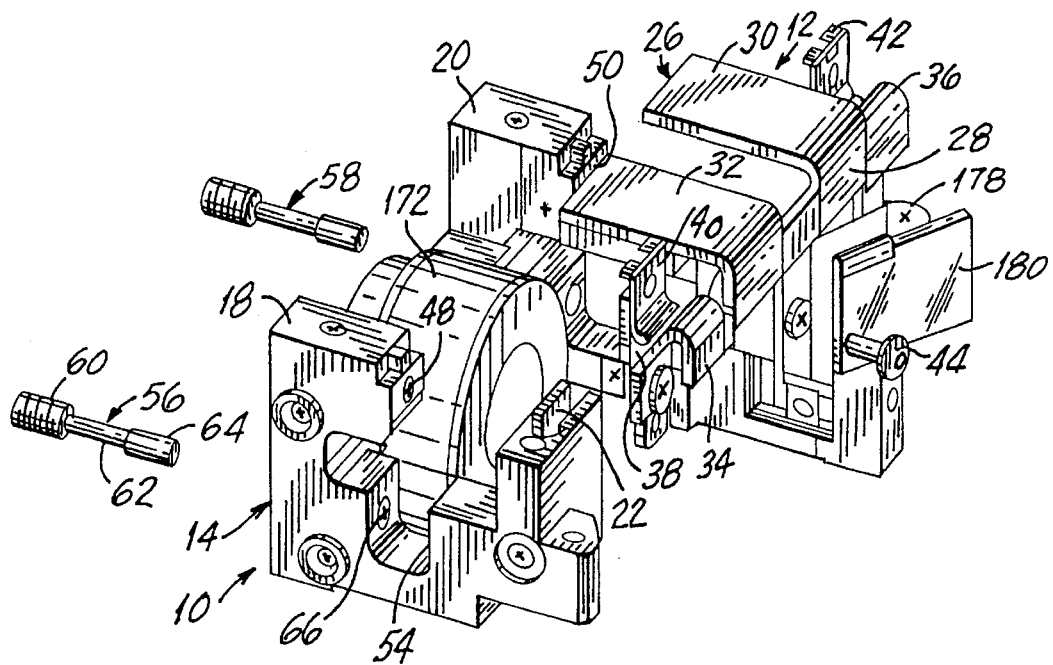
FIG. 1 is an exploded perspective view of a scanner module embodying the present invention.

As may best be seen in the exploded view of FIG. 1, the preferred scanner module consists of two separate sections: a chassis element 10 and a scan element 12. In FIG. 1, these two sections are shown in exploded form, prior to their securement together during the assembly process.

Figure 3:
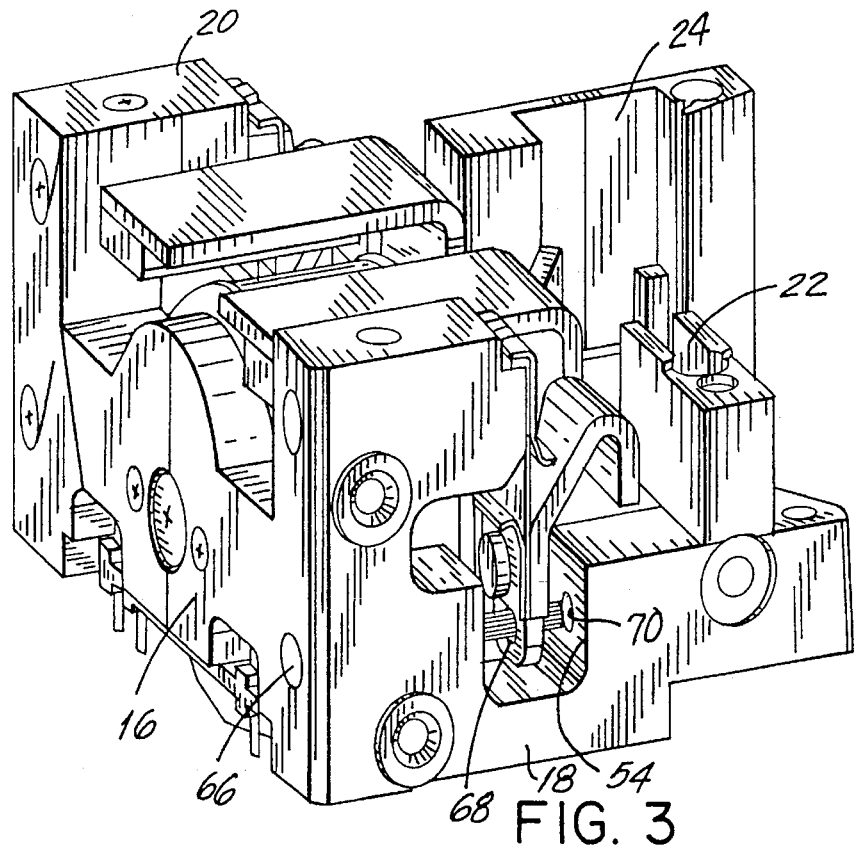
FIG. 3 is a fully assembled view of the scanner module of FIG. 1.

As is best seen in FIGS. 3 and 4, the chassis element 10 comprises a chassis 14 which carries the coil 172. The coil 172 is secured to a rear wall 16 of the chassis. At respective ends of the rear wall there are first and second forwardly-extending side supports 18, 20. The forward end of the side support 18 is provided with a vertical slot 22 (FIG. 3) into which is placed (FIG. 4) the collecting mirror 184 previously referred to. The forward part of the other side support 20 is provided with a larger vertical slot or cavity 24 (FIG. 3) into which the photodiode assembly 186 (FIG. 4) fits.

Figure 2:
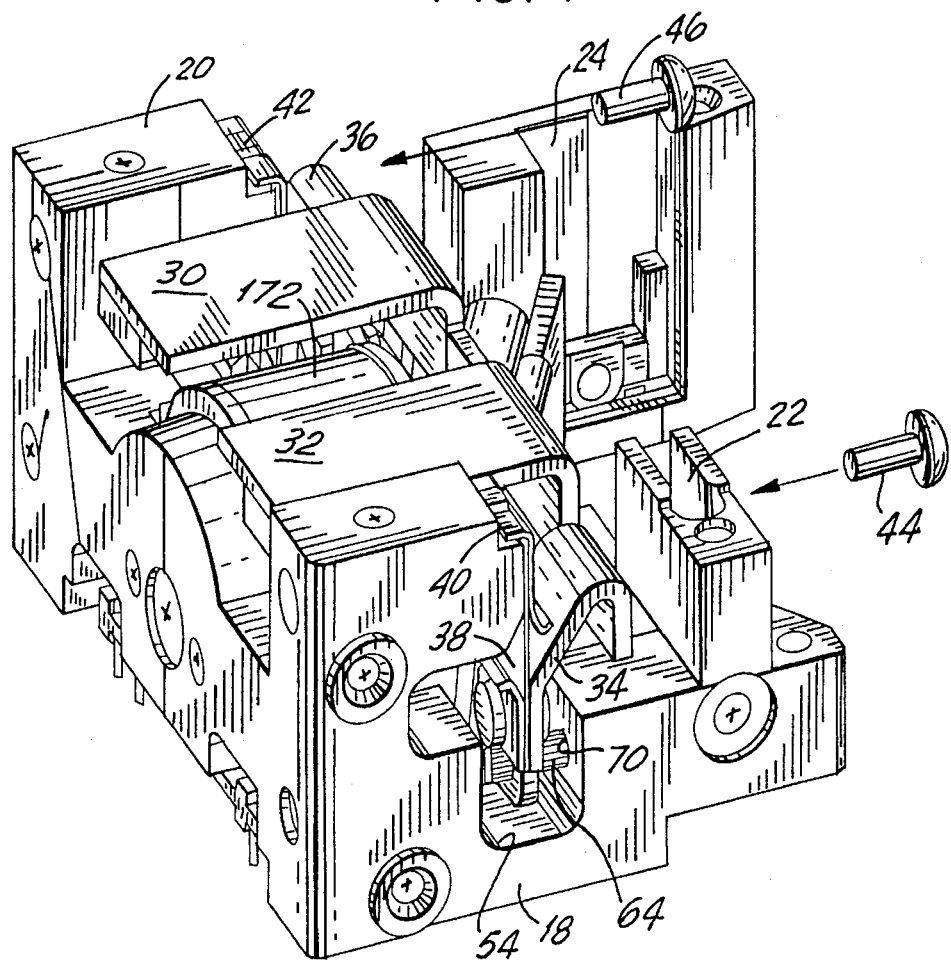
FIG. 2 is a partially assembled view of the scanner module of FIG. 1.

The features of the scan element 12 (which is during assembly secured to the chassis element 10) is best seen from a comparison of FIGS. 1, 2 and 4. The scan element comprises a beryllium-copper bracket generally shown at 26 having a vertical mounting portion 28 in a plane perpendicular to the axis of the coil 172. The upper part of the mounting portion is formed with two rearwardly-pointing prongs 30, 32 (not visible in FIG. 4). Secured to the mounting portion 28 is the spring 178, previously mentioned with reference to FIG. 5, which carries the mirror 180. On either side of the prongs 30, 32, the upper edge of the mounting portion 28 is bent backwardly to form first and second hanging brackets (34, 36, best seen in FIGS. 1 and 2). Screwed to these hanging brackets are respective first and second sheets of Mylar film 38, only one of which is visible in FIGS. 1 to 3. At the top of the Mylar sheets are secured respective hangers 40, 42.

The scanner module is assembled by bringing the scan element 12 up to the chassis element 10 and using screws 44, 46 to attach the hangers 40, 42 to respective bosses 48, 50 on the chassis side supports 18, 20. The relative positioning of the chassis element and the scan element, just prior to their securement together by the screws 44, 46 is shown most clearly in FIG. 2.

It will be appreciated that once the scanner module has been assembled, as described, the entire weight of the scan element, including the mirror 180, is supported by the hangers 40, 42 and the sheets of Mylar film 36, 38. The entire scan element is accordingly free to rock back and forth about a horizontal axis perpendicular to the axis of the coil 172 as the Mylar film flexes.

The operation of the device will now be described, with reference to FIG. 4. A laser beam, emanating from the laser beam source and lens assembly 182, passes through the hole 181 in the collector 184, and impinges upon the mirror 180 from which it is reflected via a window 52 to a bar code symbol to be read (not shown). Energization of the coil 172 causes oscillation of the mirror 180 in two directions: a first direction due to flexing of the spring 178 and a second direction due to flexing of the Mylar film 38. By appropriate control of the coil, a variety of scanning patterns can be produced, for example a raster pattern or other types of two-dimensional pattern.

Light reflected back from the bar code symbol passes back through the window 52, impinges on the mirror 180, and is reflected to the collector 184. The collector concentrates the light and reflects it back to the photo detector 186. Decoding circuitry and/or a microprocessor (not shown) then decode the signals received by the photo detector 186, to determine the data represented by the bar code.

It might be thought that because the entire weight of the scan element 12 is taken by the Mylar film 38, the system is likely to be very vulnerable to shocks, for example if the user accidentally knocks or even drops the bar code scanner within which the module is contained. However, provision has been made for that contingency by way of an anti-shock feature which will now be described.

First, as may be seen in FIGS. 2 and 3, the lower end of the hanging bracket 34 is located within a channel 54 formed in the side support 18 of the chassis. As the Mylar film 38 flexes, the hanging bracket 34 moves back and forth within the channel 54. The Mylar film 38 is prevented from over-flexing by the walls of the channel 54 which act as stops. A similar arrangement (not visible in the drawings) is provided on the other side.

A second level of protection is provided by alignment pins 56, 58, best seen in FIG. 1. Each pin comprises a threaded rear head portion 60, a reduced diameter smooth waist portion 62, and a smooth forward head portion 64.

In its operational position, shown in FIG. 3, the waist portion 62 of the pin passes through a hole 68 in the hanging bracket 34, with the forward head portion 64 being received within a correspondingly-sized blind bore 70 within one side of the channel 54. The rear head portion 60 of the pin is screwed into and held in place by a threaded bore 66 which opens at its forward end into the channel 54 and at its rearward end into the rear surface of the rear wall 16. There is a similar arrangement on the other side (not shown) for the second alignment pin 58.

The diameter of the waist portion 62 of the pin is some 0.02 inches smaller than the diameter of the hole 68 in the hanging bracket. This provides sufficient tolerance for the Mylar to flex slightly during normal operation of the device. However, if the module is dropped the presence of the pin prevents over-stressing and perhaps breaking of the Mylar.

The alignment pins have a further function of assisting accurate positioning of the scan element 12 with respect to the chassis during assembly. During assembly, the scan element is brought up into approximately the correct position, and the alignment pins are then inserted as shown in FIG. 2. At this point, the forward head portion 64 is a tight tolerance sliding fit both within the hole 68 in the hanging bracket and in the blind bore 70. This aligns the scan element to the pins and hence to the chassis. The scan element is then secured to the chassis, as previously described, using the screws 44, 46. The hangers 40, 42 provide a certain amount of adjustability or tolerance in positioning, thereby ensuring that the scan element can be attached to the chassis at the position defined by the alignment pins. The pins are then fully screwed into the threaded bores 66 until the end of the pin is flush with the rear face 16 of the chassis. At this point, as is shown in FIG. 3, the forward head portion of the pin has been received within the bore 70, and the waist portion has moved up to its final position within the hole 68 of the hanging bracket.

It will be understood that each of the elements described above, or any two or more together, may also find a useful application in other types of constructions differing from those described.

While the invention has been illustrated and described as embodied in a particular scanner module arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

1. A scan module for use in a scanner for reading indicia having parts of differing light reflectivity, the scan module comprising:
   a) a frame;
   b) a scanning component mounted to the frame for oscillatory motion, the scanning component including an optical element for directing light in a scanning pattern across an indicia to be read, the scanning component having an aperture therein; and
   c) an anti-shock member, passing through the aperture in the scanning component, the anti-shock member having a waist portion smaller in cross section than the size of the aperture, thereby providing clearance of the scanning component to oscillate relative to the waist portion in use, but preventing excessive movement of the scanning component with respect to the frame in the event that the module is subjected to a mechanical shock.

2. A scan module as claimed in claim 1 wherein the anti-shock member is a pin having a first head portion, a second head portion, and the waist portion having a smaller cross section than the first and second head portions, the waist portion being located within the aperture during normal operation of the scan module.

3. A scan module as claimed in claim 2 wherein the first head portion carries an external screw thread which is arranged to be screwed into a bore in the frame.

4. A scan module as claimed in claim 3 wherein the first head portion is substantially flush with the frame when the pin is in a position for normal operation of the scan module.

5. A scan module as claimed in claim 2 wherein the second head portion is arranged to be received within a correspondingly-sized bore within the frame.

6. A scan module as claimed in claim 5 wherein the frame comprises a first side portion, a second side portion, and a rear portion connecting the first and second side portions, the electromagnetic coil being mounted between the side portions.

7. A scan module as claimed in claim 6 including an optical collector element mounted to the first side.

8. A scan module as claimed in claim 6 including a photodetector unit mounted to the second side.

9. A scan module as claimed in claim 6 wherein the first and second sides have respective cut out portions, within which are received respective hanging brackets portions of the bracket.

10. A scan module as claimed in claim 9 wherein the hanging bracket portions are mounted to the frame by respective flexure members.

11. A scan module as claimed in claim 10 wherein the flexure members are polyester material films.

12. A scan module as claimed in claim 2 wherein the cross sectional size and shape of the second head portion corresponds with the size and shape of the aperture.

13. A scan module as claimed in claim 12 wherein the second head portion is of such a length that the pin may be positioned with the second head portion contained within the aperture and extending from the aperture into a correspondingly-sized bore within the frame, thereby locating the scanning component with respect to the frame.

14. A scan module as claimed in claim 2 wherein the pin extends across a cut out portion of the frame, the aperture being in a portion of the scanning component which extends into the said cut out portion.

15. A scan module as claimed in claim 14 wherein said cut out portion of the scanning component contains a hanging bracket.

16. A scan module as claimed in claim 15 wherein the hanging bracket is supported from the frame by a flexure member.

17. A scan module as claimed in claim 10 wherein the flexure member comprises a polyester material film.

18. A scan module as claimed in claim 1 wherein the aperture is in a portion of the scanning component comprising a hanging bracket.

19. A scan module as claimed in claim 18 wherein the hanging bracket is supported from the frame by a flexure member.

20. A scan module as claimed in claim 19 wherein the flexure member comprises a polyester material film.

21. A scan module as claimed in claim 1 wherein the scanning component is supported from the frame by a flexure member, the scanning component further including counterweight means balancing the mass of the optical element at the flexure member.

22. A scan module as claimed in claim 21 further including an electromagnetic coil mounted to the frame, the counterweight means at least partially overlying the coil.

23. A scan module as claimed in claim 1 wherein the scanning component is supported from the frame by a flexure member, and the optical element is supported from the scanning component by a further flexure member, the flexure member and the further flexure member being arranged to flex in mutually perpendicular directions.

24. A scan module as claimed in claim 1 including first and second anti-shock members, the first anti-shock member being adjacent a first side of the frame, and the second anti-shock member being adjacent a second side of the frame.

25. A scan module as claimed in claim 1 wherein the anti-shock member has a longitudinal axis, the movement of the scanning component at the aperture, during oscillation, being substantially perpendicular to the said axis.

26. A scan module as claimed in claim 1 wherein the anti-shock member comprises a pin.

27. A method of assembling a scan module for use in a scanner for reading indicia having parts of differing reflectivity, the scan module comprising: a frame; a scanning component to be mounted to the frame for oscillatory motion, the scanning component including an optical element for directing light in a scanning pattern across an indicia to be read, the scanning component having an aperture therein; and an anti-shock pin having a first head portion, a second portion, and a waist portion having a smaller cross section than the first and second head portions; the method comprising:

a) positioning the scanning component adjacent to the frame;

b) partially inserting the pin in to the frame so that the second head portion passes through the aperture and extends from the aperture in to a correspondingly-shaped bore in the frame, thereby aligning the scanning component with respect to the frame;

c) securing the scanning component to the frame;

d) continuing insertion of the pin in to the frame so that the waist portion of the pin becomes located within the aperture, thereby providing clearance for the scanning component to oscillate in use, but preventing excessive movement of the scanning component with respect to the frame in the event that the module is subjected to a mechanical shock.

28. A method of assembling a scan module for use in a scanner for reading indicia having parts of differing reflectivity, the scan module comprising: a frame; a scanning component to be mounted to the frame for oscillatory motion, the scanning component including an optical element for directing light in a scanning pattern across an indicia to be read, the scanning component having an aperture therein; and an anti-shock pin having a head portion, a second head portion, and a waist portion having a smaller cross section than the first and second head portions; the method comprising the steps of:

a) positioning the scanning component adjacent to the frame;

b) partially inserting the pin into the frame so that the second head portion passes through the aperture and extends from the aperture into a correspondingly-shaped bore in the frame, thereby aligning the scanning component with respect to the frame;

c) securing the scanning component to the frame; and d) continuing insertion of the pin into the frame so that the waist portion of the pin becomes located within the aperture, thereby providing clearance for the scanning component to oscillate in use, but preventing excessive movement of the scanning component with respect to the frame in the event that the module is subjected to a mechanical shock.

29. A method as claimed in claim 28 wherein the final location of the pin, for normal operation of the scan module, is defined by a position in which the first head portion of the pin lies flush with the frame.

30. A scan module for use in a scanner for reading indicia having parts of differing light reflectivity, the scan module comprising:

a) a frame;

b) a scanning component including a bracket mounted to the frame by flexible support means for oscillatory motion, the bracket carrying an optical element for directing light in a scanning pattern across an indicia to be read;

c) an electromagnetic coil mounted to the frame;

d) magnet means secured to the bracket adjacent the coil; and e) the bracket further including a counterweight portion balancing the mass of the optical element at the flexible support means, the counterweight portion at least partially overlying the coil.

31. A scan module as claimed in claim 30 including an anti-shock member passing through an aperture in the bracket, the anti-shock member having a waist portion smaller in cross section than the size of the aperture, thereby providing clearance for the scanning component to oscillate relative to the waist portion in use, but preventing excessive movement of the scanning component with respect to the frame in the event that the module is subjected to a mechanical shock.

32. A scan module as claimed in claim 31 wherein the anti-shock member comprises a pin.

33. A scan module as claimed in claim 32 wherein the pin has a first head portion, a second held portion, and the waist portion having a smaller cross section than the first and second head portions, the waist portion being located within the aperture during normal operation of the scan module.

34. A scan module as claimed in claim 33 wherein the first head portion carries an external screw thread which is arranged to be screwed into a bore in the frame.

35. A scan module as claimed in claim 34 wherein the first head portion is substantially flush with the frame when the pin is in a position for normal operation of the scan module.

36. A scan module as claimed in claim 33 wherein the head portion is arranged to be received within a correspondingly-sized bore within the frame.

37. A scan module as claimed in claim 33 wherein the cross sectional size and shape of the second head portion corresponds with the size and shape of the aperture.

38. A scan module as claimed in claim 37 wherein the second head portion is of such a length that the pin may be positioned with the second head portion contained within the aperture and extending from the aperture into a correspondingly-sized bore within the frame, thereby locating the scanning component with respect to the frame.

39. A scan module as claimed in claim 33 wherein the pin extends across a cut out portion of the frame, the aperture being in a portion of the scanning component which extends into the said cut out portion.

40. A scan module as claimed in claim 30 wherein the optical element is supported from the bracket by a further flexible support means, the flexible support means and the further flexible support means being arranged to flex in mutually perpendicular directions.

41. A scan module for use in a scanner for reading indicia having parts of differing light reflectivity, the scan module comprising:

a) a frame;

b) a scanning component including a main bracket mounted to the frame by flexible support means for oscillatory motion, the main bracket carrying an optical element for directing light in a scanning pattern across an indicia to be read, the main bracket having an aperture therein;

c) an electromagnetic coil mounted to the frame;

d) magnet means, secured to the bracket adjacent to the coil;

e) the bracket further including a counterweight portion balancing the mass of the optical element at the flexible support means, the counterweight portion at least partially overlying the coil; and f) an anti-shock member passing through the aperture in the main bracket, the member having a waist portion smaller in cross section than the size of the aperture, thereby providing clearance for the scanning component to oscillate relative to the waist portion in use, but preventing excessive movement of the scanning component with respect to the frame in the event that the module is subjected to a mechanical shock.

42. A scan module for use in a system for electro-optically reading coded indicia, comprising:

a) a frame;

b) a scanner component mounted for oscillating movement on the frame to direct light therefrom toward the coded indicia during said oscillating movement;

c) an anti-shock member mounted on the frame and having an anti-shock portion that extends with clearance through the scanner component; and d) means for oscillating the scanner component relative to the anti-shock portion within a predetermined range of motion.

* * * * *